United States Patent Office 3,610,005
Patented Oct. 5, 1971

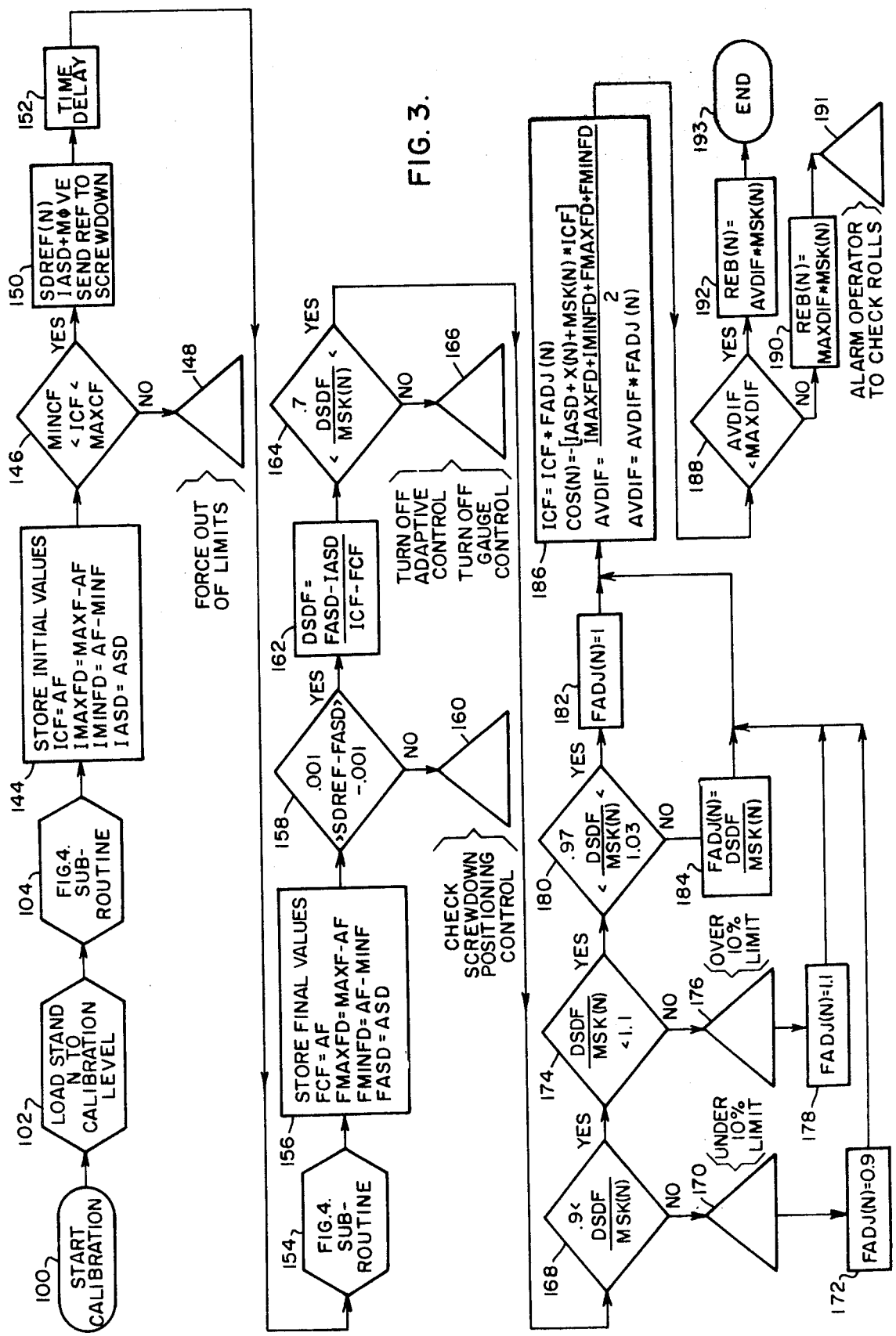

3,610,005
ROLL POSITIONING SYSTEM CALIBRATION
METHOD AND APPARATUS
Andrew W. Smith, Jr., Pittsburgh, Pa., assignor to
Westinghouse Electric Corporation, Pittsburgh, Pa.
Filed May 27, 1969, Ser. No. 828,265
Int. Cl. B21b 37/00
U.S. Cl. 72—8
15 Claims

ABSTRACT OF THE DISCLOSURE

There is described a control arrangement to periodically check the operation of the screwdown control system of a rolling mill stand, including the roll force sensing apparatus and the screwdown positioning apparatus for each stand of a rolling mill. A programmed digital computer, or central processing unit, controls the calibration operation and determines when it is desired to calibrate the screwdown control system. This may be several times a day, including each time that one or more rolls of a given roll stand are changed.

This calibration operation is accomplished by sensing the corresponding initial screwdown position indication ISD for each such stand (N) at a predetermined initial calibration roll force ICF, and then moving the given mill stand (N) a known distance SD and reading the final calibration roll separating force FCF and corresponding final screwdown position indication FSD for the purpose of determining the mill spring modulus MSK(N) or slope of the resulting mill spring curve for that respective stand (N). The so determined mill modulus MSK(N) can now be compared to a previous known value of the mill modulus, as now stored in the memory of the central processing unit for the stand (N). Any error or difference in these respective mill modulus values can be compared with predetermined limits to determine if a multiplying factor FADJ(N) should be used when the stand load cell sensed roll force signal F(N) is fed into the central processing unit or computer for the purpose of determining the subsequent roll force gauge control operation of the given mill stand (N).

BACKGROUND OF THE INVENTION

The digital computer control of any rolling mill stand, using roll force control techniques, requires that the mill spring curve for each stand of the rolling mill be predetermined and known to control the screwdown positioning system as desired for each stand of that mill. The mill spring curve for each stand can be established by taking up to 100 readings to measure the mill spring or stretch modulus K for that stand in terms of the well known roll force versus roll opening relationships, at progressively increasing roll force values from the condition where the stand work rolls first touch, and a roll force reading is established, up to a roll force range beyond the normal roll force operating range of the mill stand. The provision and use of such a curve for gauge control is generally disclosed in U.S. Pat. 2,726,541 of R. B. Sims.

Most rolling mill computer control systems depend on the roll force signal from a load cell transducer operative with each stand to calculate the actual workpiece thickness or gauge delivered from a given stand. The hardness characteristic of the workpiece product being rolled in a given stand is determined by the difference between the roll force predicted for a given reduction and workpiece delivery gauge and the actual roll force required to roll that delivery gauge of work product.

Rolling mill applications involving on line computer setup and adaptive gauge control systems, using predicted stand roll forces and then updating the respective stand roll force predictions for a succeeding workpiece in accordance with actually sensed roll force and stand delivery gauge values relative to the rolling of a previous similar gauge and grade workpiece, depend on a good load cell and screwdown position detector calibration relative to a known stand mill spring modulus. It has been the practice to assume that the mill spring modulus is a known quantity for any given stand, that remains substantially constant and is based on the above described preliminary calibration tests performed on each mill stand during startup of the rolling mill stand. However, experience has shown that the individual stand roll force transducers and their associated electronic equipment do not maintain this desired good calibration.

On-line computer control of particularly hot strip tandem rolling mills, and adaptive stand roll force and screwdown position scheduling of the screwdown position for each rolling mill stand, has already been provided wherein the required roll force for each stand has been predicted from model equations and the related screwdown position setting has been determined by use of the well known mill spring equation $$h = So + F/m$$

described in the above referenced Sims patent, where $m$ is the mill spring constant, in advance of the workpiece strip reaching the respective stands of the rolling mill. In the description that follows, MSK(N) is used to denote the mill spring constant for stand N; MSK(N) is the same as $1/m$ as described by Sims, so the mill spring equation here becomes $h = So + F[MSK(N)]$. In order to pre-schedule the screwdown settings of the rolling mill stands, it is necessary to have reliable screwdown position detectors for reach stand and to make sure that the roll force sensor or load cell operative with each stand gives repeatable and accurate actual stand roll force signals to the computer control system.

The present invention is related to the need to properly control the operation of the rolling mill, when new work rolls have been provided for one or more roll stands. Additionally, it relates to the operation of the rolling mill after it has not been operated through the night and has cooled down such that the first thing to do the following morning is to calibrate the screwdown position control apparatus in relation to the output signals from the roll force transducer and the screwdown position detector for each stand. For any workpiece thickness scheduled to be delivered from a given stand of the rolling mill, operation of the position control apparatus for the screws for that stand must be properly calibrated.

SUMMARY OF THE PRESENT INVENTION

For calibrating the screwdown position control apparatus for each stand of a rolling mill, the rolls of that stand are pre-loaded by the control computer, with no workpiece in the mill stand and down below face where the work rolls are touching, by driving the work rolls together to pre-load the mill to a load value in the range of the normal rolling load value which can be in the order of four million pounds. The mill spring curve for each stand of the rolling mill has a non-linear portion in the range from zero to about one million pounds, and at forces above about one million pounds roll force the mill spring curve becomes substantially linear. It is assumed that the rolling mill stand has enough screwdown power to go down below face such as would be true for a modern plate mill, hot strip mill or cold strip mill. When the mill stand is so loaded, in the order of four million pounds, this is a screwdown position of approximately 150 mils below face, and a calibration operation in accordance with the present invention can then be undertaken.

The digital computer control system, after the initial calibration force ICF(N) in the order of 4 million pounds is applied to the rolls, then schedules a predetermined movement of the rolls, for example 50 mils, since the mill spring characteristic or modulus is predictable and known from past running of the mill stand, the resulting change in roll force to a final calibration roll force FCF should be predictable. The actual final calibration roll force FCF is measured with the signal supplied by the stand load cell. This enables the now determined slope DSDF of the now determined linear portion of the mill spring curve to be determined and compared to the previous determined and known slope MSK(N) of the mill spring curve on a stand by stand basis.

By dividing the distance SD that the rolls were opened by the change in roll force ICF–FCF, this enables the mill spring modulus DSDF to be calculated, which is the effective slope of the stand mill spring curve relative to its linear portion. This slope should correspond to previously determined values of the slope of the mill spring curve for the same stand. If it does not, an assumption is made that the roll force transducer, which is an electronic device, has been damaged by too much force. Also, the roll force transducer is prone to drift or get out of adjustment from having been fatigued by being subjected to successive impact loads many hundreds of times. Even slow deterioration has been noted in the operation of the stand screwdown position detector as well as the stand load cell.

In the normal operation of a typical rolling mill stand, the work rolls are changed about every 4 hours and this requires that a calibration procedure be followed every time this is done. The digital computer includes, prestored in its memory, the necessary control program to effect the calibration operation in accordance with the teachings of the present invention; at any time that it appears desirable for any reason that a given mill stand should be calibrated, the calibration control program can be initiated.

If the newly calculated mill spring curve slope is substantially different from previously calculated values for this slope, the control computer can effect a comparison with the previous and now stored value. If it is different by an amount greater than a predetermined limit such as ±10%, the mill operator can be alarmed in regard to the need to fix the roll force sensor operative with the particular rolling mill stand. If the comparison shows a difference of less than ±10%, then the computer can change the multipler FADJ(N) applied for the given stand, relative to the roll force axis of the mill spring curve, as needed to correct the now sensed roll force signal error.

It is generally desirable to know where the zero roll opening position of any given stand is relative to the position indication output signal of the screwdown position detector, but this is difficult to determine because the nonlinear portion of the stand mill spring curve is hard to predict in that it depends upon the meshing of involved gears, the meshing of the nut in the screw and how viscous is the lubrication and the shape of the roll crown and so forth. Once all of the latter determinants are squeezed out and the mill stand loading gets up to a higher force such a 4 million pounds, then a reliable benchmark setting is provided. This enables a reliable determination of the stand mill spring modulus (the slope of the mill spring curve), and a reliable calibration can be determined for the screwdown position system.

The model equations used for the stand roll force prediction and screwdown setting, to effect the desired thickness control of the rolled work product, state that the deflection or roll opening is related to the roll force of the stand. The lower stand roll forces are harder to measure and less precise, in that for narrow and soft products the actual operation of any given stand may get down to roll forces where the mill spring curve is non-linear.

In accordance with the present invention, the process computer control system includes a digital computer, or general hardware control processor unit, coupled with a software sequentially stepped control program which is entered into and stored within the storage memory unit of the digital computer. In this way there is achieved a novel extended control apparatus embodiment, which includes the programmed computer control system, and is operative to provide an updating calibration of the roll force transducer and screwdown position detector operative with each of the stands of a rolling mill, whenever this may be desirable to improve the operation of the rolling mill. The calibration of the individual stands can take place successively in a one at a time manner, starting with a selected stand such as the first stand and then selectively proceeding to a second stand and so on until all stands have been calibrated that are desired to be calibrated. On the other hand, it should be understood that it is within the teachings of the present invention to calibrate only one or maybe two selected stands of the rolling mill in relation to some event happening, such as the rolls of a particular stand are changed or for some other reason the mill operator wants to check the operations calibration of some particular stand.

It is an object of the present invention to provide an improved method and apparatus to better calibrate the screwdown position control system of each stand of a rolling mill, including a roll force sensing load cell and a screwdown position detector, to enable a better realization of the desired operation of each stand in relation to the delivery thickness or gauge of the work product leaving each stand of the rolling mill.

These and other features and objects of the present invention will become more apparent in view of the following detailed description in reference to the drawings, in which:

BRIEF DESCRIPTION OF THE DRAWINGS

In FIG. 3 there is shown the computer functional control program flow chart for providing the screwdown control system calibration in accordance with the present invention.

DESCRIPTION OF A PREFERRED EMBODIMENT OF THE PRESENT INVENTION

Figure 1:
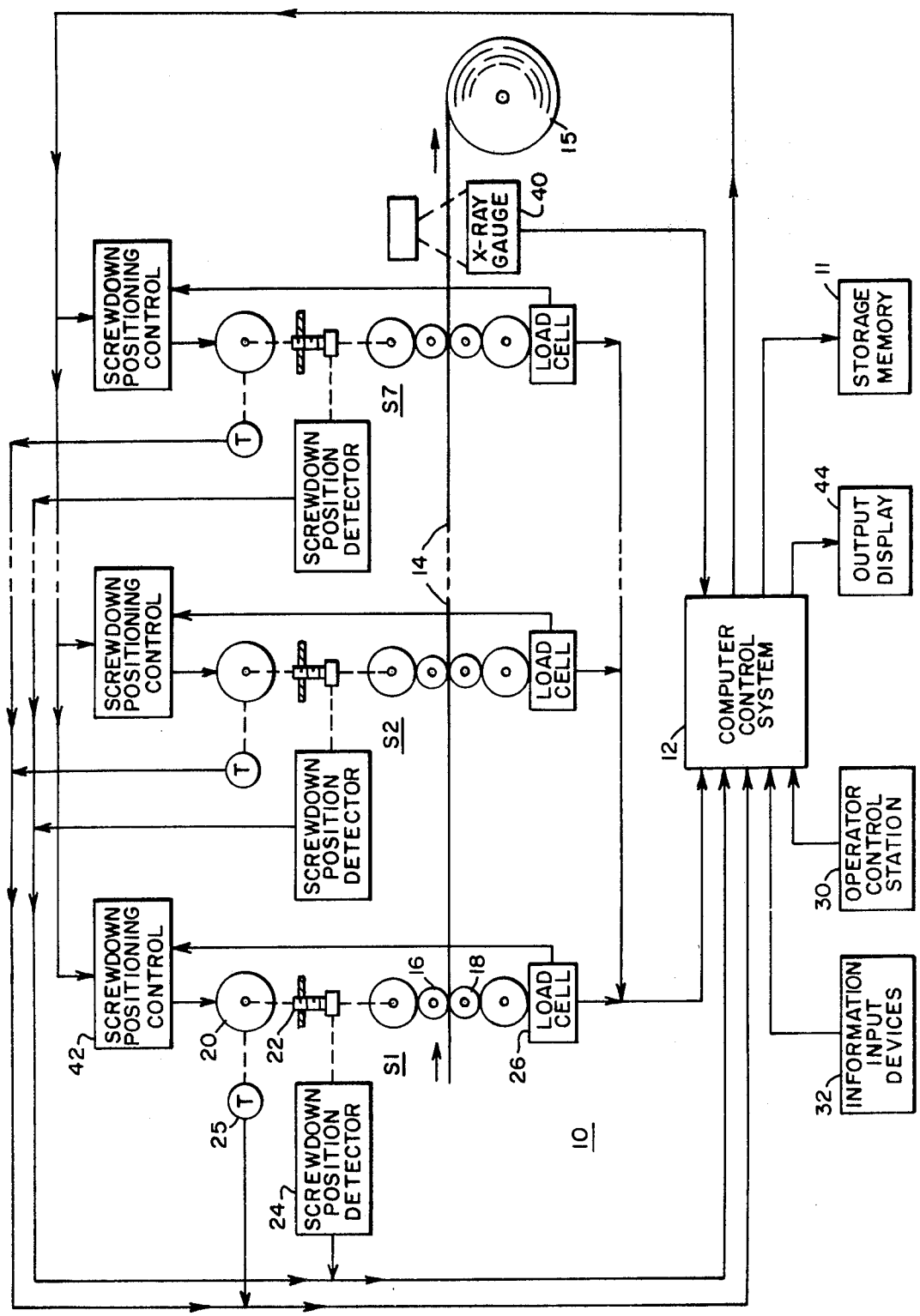
In FIG. 1 there is shown a diagrammatic view of a computer controlled tandem rolling mill, including a plurality of stands.

In FIG. 1 there is shown a tandem hot strip steel mill 10 which is controlled in its operation by a computer control system 12 in accordance with a control program stored in its storage memory 11. In general, the present invention is applicable to various types of mills in which roll force gauge control and roll force load sensors are employed. Thusly, it can be suitably adapted for application in plate reversing mills and other types of rolling mills.

The tandem mill 10 includes a series of reduction rolling stands S1 through S7 for the example of a seven stand mill, with only three of the stands S1, S2 and the last stand S7 being shown. A workpiece 14 enters the mill 10 at the entry side of stand S1 in the form of a bar, and it is elongated and reduced in thickness as it is transported through the successive stands S1 through S7 to the delivery end of the mill, where it can be coiled as a strip on a down coiler 15. The entry bar 14 would be of known steel grade and it typically would have a thickness of about one inch, and a width within some limited range such as 20 inches to 80 inches, if the rolling mill 10 is a hot strip finishing mill. The delivered strip would usually have approximatey the same width and a thickness based upon the production order for which it is intended.

In the reduction rolling process the successive stands operate at successively higher speeds to maintain proper workpiece mass flow. Each stand produces a desired predetermined reduction or draft, such that the total mill draft reduces the entry bar to strip with the desired delivery gauge. Each stand is conventionally provided with a pair of work rolls 16 and 18 between which the workpiece 14 is passed. A large DC drive motor is controllably energized at each stand to drive the associated work rolls at a controlled speed.

As previously mentioned the sum of the unloaded work roll opening $So$ and the mill stretch $F[MSK(N)]$, where F is the stand roll force and $MSK(N)$ is the stand mill spring modulus, substantially defines the workpiece gauge H delivered from any particular stand in accordance with the well known Hooke's law relationship. To vary the unloaded work roll opening $So$ at each stand, a pair of screwdown motors 20, with only the screwdown motor for one side of the stand being shown in FIG. 1, position respective screwdowns 22 which apply force against the opposite ends of the backup rolls and thereby apply pressure to the work rolls. Normally the two screwdowns 22 at a particular stand would be in identical positions but they can be located in different positions for strip guidance during threading, for flatness or strip shape or possibly for other control purposes.

A screwdown position detector or encoder 24 provides an electrical output signal to indicate the screwdown position at each stand. To provide a desired correspondence between the actual screwdown position and the desired screwdown position between the associated work rolls, a screwdown position control system which includes the screwdown position detector 24 should be calibrated from time to time as previously described.

The digital computer control system 12 can include a central integrated process control or setup processor with associated input and output equipment such as generally described in an atricle entitled "Understanding Digital Computer Process Control" by B. H. Murphy, which appeared in Automation Magazine, January 1965, pages 71 to 76.

Each computer processor is associated with predetermined input systems not specifically, shown, which typically include a conventional contact closure input system which scans contact or other signals representing the status of various process operating conditions, a conventional analog input system which scans and converts process analog signals and operator controlled and other input devices and systems such as the operator control station 30 and the information input devices 32, which could include paper tape, teletypewriter and dial input apparatus. It is noted that the information input devices 32 are generally indicated by a single block in FIG. 1 although different input devices can and typically would be associated with the computer control system 12. Various kinds of information are entered into the computer control system 12 through the information input devices 32 including for example desired strip delivery gauge and temperature, strip entry gauge and width by entry detectors, grade of steel being rolled, any selected workpiece plasticity tables, hardware oriented programs and control programs for the programming system and so forth. The contact closure input system interfaces the computer control system 12 with the process through the medium of measured or detected variables. For the purpose of the present invention, typical mill signals include the following.

(1) A roll force signal $F(N)$ from the load cell 26 at each stand S1 through S7 proportional to the total stand roll separating force.

(2) A 14 bit indicated screwdown position signal $SD(N)$ generated by each of the respective detectors 24 at the stands S1 through S7 for use in the desired computer control operation.

To effect desired control actions, control devices are operated directly by means of output system contact closures or by means of analog signals derived from output system contact closures through a digital to analog converter. One such control action outputs from the computer control system 12 the individual stand screwdown positioning command signals $SDREF(N)$ which are applied to the respective screwdown positioning controls 42 for each of stands S1 through S7 to determine the operation of the screwdown motor 20 for desired screw positional movement at each stand. In addition, the previously determined mill spring modulus $MSK(N)$ for each stand is stored in memory, along with the force signal multiplying factor $FADJ(N)$ for each stand. The calculated offset signal $COS(N)$ is sent to the screwdown positioning control to correct for the positional error of the associated screwdown position detector for each stand. The roll eccentricity deadband $REB(N)$ signal is operative with the roll force gauge control system for its respective stand.

A suitable output display 44 is provided for operation with a computer control system 12 in order to keep the mill operator generally informed about the mill operation and in order to signal the operator regarding an event or alarm condition relative to any particular stand which may require some action on his part. The printout system associated with the output display 44 is also used to log mill data according to to computer log program directions.

At the startup of a typical gauge controlled rolling mill operation, the computer control system 12 generates the respective desired screwdown preset output signals which are coupled as position reference signals to the respective screwdown positioning control 42 for each stand. The screwdown motor 20 for each stand is thereby controlled to drive the screwdowns 22 and produce the respective desired unloaded roll openings $So$ in accordance with the preset screwdown reference signal $SD(N)$ at each of the stands S1 through S7 to provide the desired work strip delivery gauge from each stand. In accordance with the well known and conventional prior art practice the setup values are based upon bar entry data such as bar width, thickness and temperature data, on desired strip delivery characteristics, program drafting rules, updating information from previous workpiece setup results and so forth. During a typical rolling operation the on-line gauge control system operates in this manner the respective stands S1 through S7 to produce strip product having desired gauge and proper shape. That is, flat with slight crown. The on-line gauge control is provided by the conventional roll force gauge control loops (not shown) operative with each of the stands S1 through S7.

Figure 2:
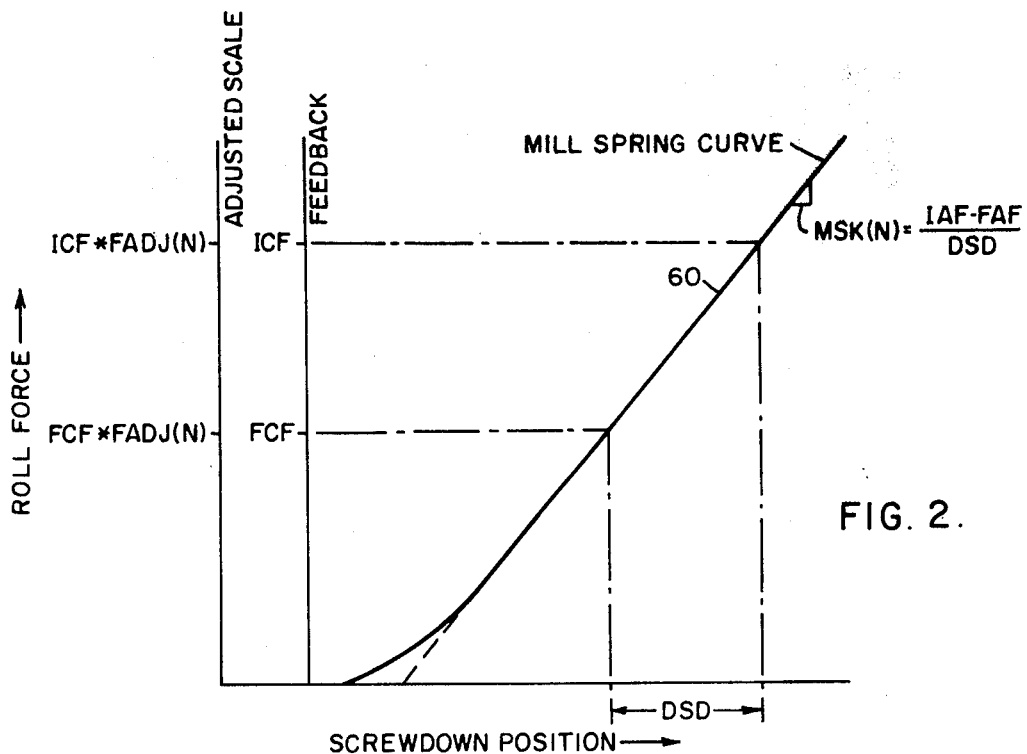
In FIG. 2 there is shown a typical mill spring curve for a rolling mill stand.

In FIG. 2 there is shown a mill spring curve for a typical stand (N), which curve is plotted as a function of screwdown position versus stand roll force. The curve 60 does not start at zero value of screwdown position, since the screwdown position detector for a particular stand is usually not calibrated to give a zero reading of the screwdown position at a zero roll opening condition. In actual practice due to gear slope and so forth, some erroneous screw position setting reading would otherwise be likely to occur at roll force equal to zero when the work rolls initially touch. Since it is generally difficult to show a negative number on a mechanical dial, and its coupled position signal generator such as the screwdown position detector comprises, an initial arbitrary reading of 200 mils or the like is introduced so the dial will not have to show a negative reading. In addition regardless of reasonable effort undertaken, zero roll opening is difficut to detect since a little bit of slope can make a 20 mil error in the reading of the screwdown position detector. It is for this reason that a preloading in the order of four million pounds of roll force is applied as the initial calibration force ICF to squeeze out these variables and to improve the accuracy of the output signal from the screwdown position detector. When the control computer system measures the screwdown position at four million pounds of initial calibration roll force ICF, the computer can arbitrarily say this should represent an initial screwdown position ISD of 150 mils. The computer is programmed to effect a predetermined screwdown position change, for example from 150 mils to 100 mils, and the computer can predict from the previous known mill spring curve slope or mill modulus MSK(N) that there should result a force change from an initial calibration force ICF of four million pounds to a predetermined lower final calibration roll force FCF in the order of, for example, 2.25 million pounds. If the mill modulus has not changed, and the final calibration force FCF is not 2.25 million pounds, an assumption is made that the load cell for the particular stand (N) has changed. This enables the control computer system to calculate an offset COS(N) to provide a correction calibration of the screwdown position detector and to calculate the force multiplying factor FADJ(N) to provide a correction calibration of the roll force load cell. However, since the screwdown position detector 24 is digital in operation, and usually works or does not work, it can be checked in other ways; thereby, an assumption is made that the roll force transducer or load cell 26 is in error, and accordingly the ordinate axis of the mill spring curve shown in FIG. 2 is varied by a determined multiplication factor FADJ(N) such that the actual roll force reading obtained from the load cell 26 for the particular stand (N) being calibrated is modified by this adjustment multiplier FADJ(N) before the control computer system 12 utilizes the roll force signal reading in the roll force and unloaded roll opening determination model equations which are utilized particularly for predicting stand roll force and screwdown position relative to a desired workpiece reduction and roll force automatic gauge control operation of the tandem stand rolling mill.

A modification of the present invention could include separate electronic counters operative with the screwdown position detector for the respective sides of each mill stand. The computer could sum the readings from these two electronic counters and divide them by two to provide an average screwdown position reading. In addition the computer can watch for any difference between the respective output signal screwdown positions to see if they are the same to indicate that the roll stand is level. The individual load cells on the respective sides of each mill stand will indicate when one side of the mill stand is first to pick up roll force; the computer could be operative to have a fast run operation to bring the rolls of each stand together until such a roll force signal indicates that the rolls at one side of the stand are almost touching, then slow down the closing after the rolls are almost in contact. The problem of new diameter rolls being substituted for previous rolls, with new shims on the bearings and the like, may make it desirable for an operator to monitor this latter operation.

After a change of the work rolls from a given mill stand, even to operate the mill stand manually, the screwdown position as provided by the screwdown position detector 24 for that mill stand must be calibrated for proper roll force control operation of the mill stand. Under normal workpiece rolling conditions with a workpiece present between the work rolls, the stand roll force is the intersection of the plastic curve for the particular workpiece product and the mill spring curve for the mill stand, and there can occur conditions, for example, when the rolls are 40 mils below face that the stand roll force will be something between 3 million pounds to 1 million pounds, and this is not meaningful information unless the workpiece gauge out of the stand is known. Thusly, with the mill stand empty and then providing a predetermined calibration operation in accordance with the teachings of the present invention, the mill stand is at this time ideal for calibration since it is running along a known workpiece gauge of zero since no workpiece is present between the work rolls.

There are many occasions in the computer controlled operation of a mill stand when the mill spring modulus or the value MSK(N) is desired. For example, when it is desired to predict the desired roll force for a given stand prior to the workpiece entering that stand in accordance with predetermined model equation relationships to the known gauge and grade characteristics of the workpiece such that the unloaded screwdown setting of the stand can be determined in advance to deliver the desired work strip gauge out of that stand. Another instance where the mill spring modulus MSK(N) is desired occurs when a measurement of the stand roll force during actual rolling of a workpiece takes place and it is desired to calculate what gauge is actually delivered by the measured roll force and screw setting, in accordance with the well known mill spring formula as set forth in the above mentioned Sims patent.

Another computer control operation for a tandem rolling mill where the mill spring modulus is utilized is an offset program, which equates the roll force determined stand delivery gauge with a mass flow or speed determined stand delivery gauge, when the strip has passed through the last stand of the tandem rolling mill and an X-ray gauge measures the actual thickness of the workpiece strip delivered from the last stand. The product of this X-ray determined gauge times the measured speed of the last stand is then equated to the product of the speed and delivery thickness of the strip leaving each of the preceding stands, and since the exit speed of the strip from each stand can be determined using a model equation for stand slip, this enables a mass flow determination of the actual gauge delivered from each of those preceding stands. An offset correction, which is the difference between the mass flow delivery gauge and roll force stand delivery gauge determined in this manner is added to the roll force determined gauge for the purpose of improving the operation of the roll force gauge control system operative with each of the mill stands. However in general, the less offset correction or adjustment that is required, the more precise is the control operation of the rolling mill, and this also enables an improved operation of related rolling mill computer control programs.

In addition, if the roll force load cell 26 is putting out an erroneous roll force signal, a stand correction factor can be determined as the ratio of the measured stand roll force to the predicted stand roll force. By determining a stand correction factor for each rolling mill stand relative to a particular grade and gauge workpiece, this permits the rolling mill to run for an extended period of time with an erroneous operating roll force load cell. However, as product changes occur from one workpiece gauge to another, gauge control problems in the operation of the rolling mill are introduced.

If in practice the roll force load cell 26 for a given stand is providing an erroneous signal, and therefore the mill modulus MSK(N) or slope of the mill spring curve is not correctly known, the offset program changes the offset correction COS(N) for any stand including a faulty load cell to make the resulting operation pass through the desired point on the mill spring curve. Since the workpiece gauge is measured out of the last stand by the X-ray gauge, and in effect the mill spring curve can be shifted back and forth as desired by operation of the offset correction, the delivery gauge from a particular stand as determined by the mass flow principle can be made in this way to agree with the delivery gauge determined by the roll force principle. This happens because the X-ray gauge reading is ratioed all the way back to each individual stand using the product of exit speed and delivery gauge for that stand in relation to the exit speed and delivery gauge from the last stand, and the offset correct introduced into the roll force determined delivery gauge compensates for any difference between the roll force determined delivery gauge and the mass flow determined delivery gauge. In addition, any rolling errors from a preceding stand is corrected in succeeding stands in this manner.

Another problem where the mill spring modulus $MSK(N)$ is important arises when the rolling mill has been operating for a period of time with a particular width of work product, and then suddenly a wider work strip enters the mill. This requires a greater roll force at each stand to make a given reduction in the work strip and necessitates the mill stand to operate further up on the mill spring curve. The computer notices a variance in the operation and initially introduces a calculated stand offset correction factor $COS(N)$ to bring the work strip to the desired gauge. Thusly, it should be seen that the computer control arrangement causes each roll stand to settle down in its operation after one or two workpiece coils of the same grade and gauge have passed through the rolling mill, but when the gauge of the work product has changed this can introduce some initial slight errors in the delivery gauge for one or two coils of the new gauge and grade because the stand roll force and mill modulus or both for each of the stands are not known as well as after one or two coils of this particular grade and gauge have passed through the rolling mill.

In reference to the mill spring curve shown in FIG. 2, the computer control system operates each mill stand when empty to provide the two spaced readings on the mill spring curve corresponding to an initial calibration force ICF, for example 4 million pounds, and then moving the screwdown position a predetermined amount IASD–FASD after which a second and final calibration roll force reading FCF is taken for that same stand. This enables an updating of the mill spring modulus $MSK(N)$ or slope of the mill spring curve, and the computer control system can compare this updated value with previously known values of the mill spring modulus for the particular mill stand to determine if an adjustment $FADJ(N)$ is required in the roll force ordinate axis relative to the stand roll force signal from the stand load cell 26. If more than a 10% difference in the mill spring modulus has been noted, an alarm can be indicated to the operator. In addition, if over a 30% change in the mill spring modulus has been noted by the computer, the latter can refuse to control the mill by roll force principle until a particular stand load cell is repaired or replaced. For the latter circumstance the computer control system can provide a plurality of control arrangements in accordance with the desire of the operator. For example, the computer control system can permit the mill to run if over a 30% change has occurred in the mill spring modulus for a given stand, but not the updating adaptive control arrangement whereby force correction factors are provided relative to a given workpiece strip passing through the rolling mill to correct predicted roll forces for suceeding stands in accordance with the ratio of the sensed stand roll force to predicted roll force of previous stands where the work strip has entered these previous stands. Further the stand correction factor determination to correct the predicted roll force relative to a faulty load cell stand for a succeeding work strip may not be desirable as a mode of operation. Under the latter conditions the computer control arrangement could schedule the setup of the individual mill stands regarding speed and screwdown position, but any correction in speed or screwdown positions to get on desired work strip gauge and have good relative speeds among the stands will be left up to the operator.

If a screwdown sensor is provided for the respective sides of each rolling mill stand, when a workpiece having unequal edge shapes passes through that particular stand, a clutch can be opened and one side is screwed down as required for the strip to come out of the stand straight, particularly during threading of the rolling mill. In general, if the readings of each screwdown position detector are added together and the sum is then divided by 2, this gives an average or effective screwdown position setting relative to the center of the work strip.

The curve 60 shown in FIG. 2 illustrates an application of Hooke's law to a rolling mill stand and is the basis upon which the process computer control system 12 provides improved gauge control and other operating benefits. The mill spring curve 60 defines the separation between a pair of mill stand work rolls as a function of roll separating force and as a function of resulting screwdown position. The slope of the mill spring curve 60 for a given stand N, or the mill spring constant or modulus $MSK(N)$, is subject to variations as previously described. When a correct screwdown calibration is known, and the screwdowns are positioned such that the empty work rolls are just facing or touching, the unloaded screwdown zero position is defined. The zero screwdown mill spring curve location is not shown but would be positioned such that the dashed linear extension of the linear portion of the mill spring curve would pass through the zero screwdown position on the screwdown position axis of the curve shown in FIG. 2. Due to the non-linearity of the lower portion of the mill spring curve, roll facing actually occurs when the screwdown position is at a slightly negative value.

At any particular screwdown position, and with the correct screwdown calibration, the stand workpiece delivery gauge equals the unloaded roll opening as defined by the screwdown position $So$ plus the mill stretch defined by $F(N)$ times $MSK(N)$ caused by the workpiece. If the screwdown calibration is incorrect, that is if the number assigned to the theoretical roll facing screwdown position is something other than zero because of roll crown, wear or other causes, the stand workpiece delivery gauge equals the unloaded roll opening plus the mill stretch and plus or minus the calibration offset error $COS(N)$.

The well known gauge meter or roll force gauge control system has been widely used to produce stand gauge control for metal rolling mills, and particularly in tandem hot strip steel rolling mills and reversing plate mills where experience has demonstrated that roll force gauge control is particularly effective. To embody this rolling principle in an actual roll force gauge control system, a load cell 26 or other roll force detector measures the roll separating force and the screwdown position is controlled to match the resulting delivery work strip gauge relative to a reference desired work strip delivery gauge to thereby hold the loaded roll opening at a substantially constant and desired value.

In FIG. 3 there is shown a functional flow chart to illustrate the sequential operation software control program operative with the computer control system 12 shown in FIG. 1. Included is a digital computer which has a plurality of parts or sub-systems such as an input sub-system which accepts the input data in machine readable form and translates this data into a suitable computer code, a storage memory 11 or storage sub-system which stores data in binary form in a large bank of two-state devices such as magnetic cores, a control sub-system which originates instruction commands to determine the operation of each part of the computer system, a processing or arithmetic sub-system which performs basic arithmetic operations and makes logical comparisons and edits data as needed, and an output subsystem which takes binary data from storage memory and translates them as needed by output media or other devices.

In the control program of FIG. 3, the operation is initiated at step 100 by an operator push-button or other program initiation as may be desired. When the stand roll force is at the desired initial calibration level ICF, such as 4 million pounds, step 104 initiates the FIG. 4 sub-routine. The FIG. 4 sub-routine will now be described in detail, since it is relevant here to an understanding of the present invention.

Figure 4:
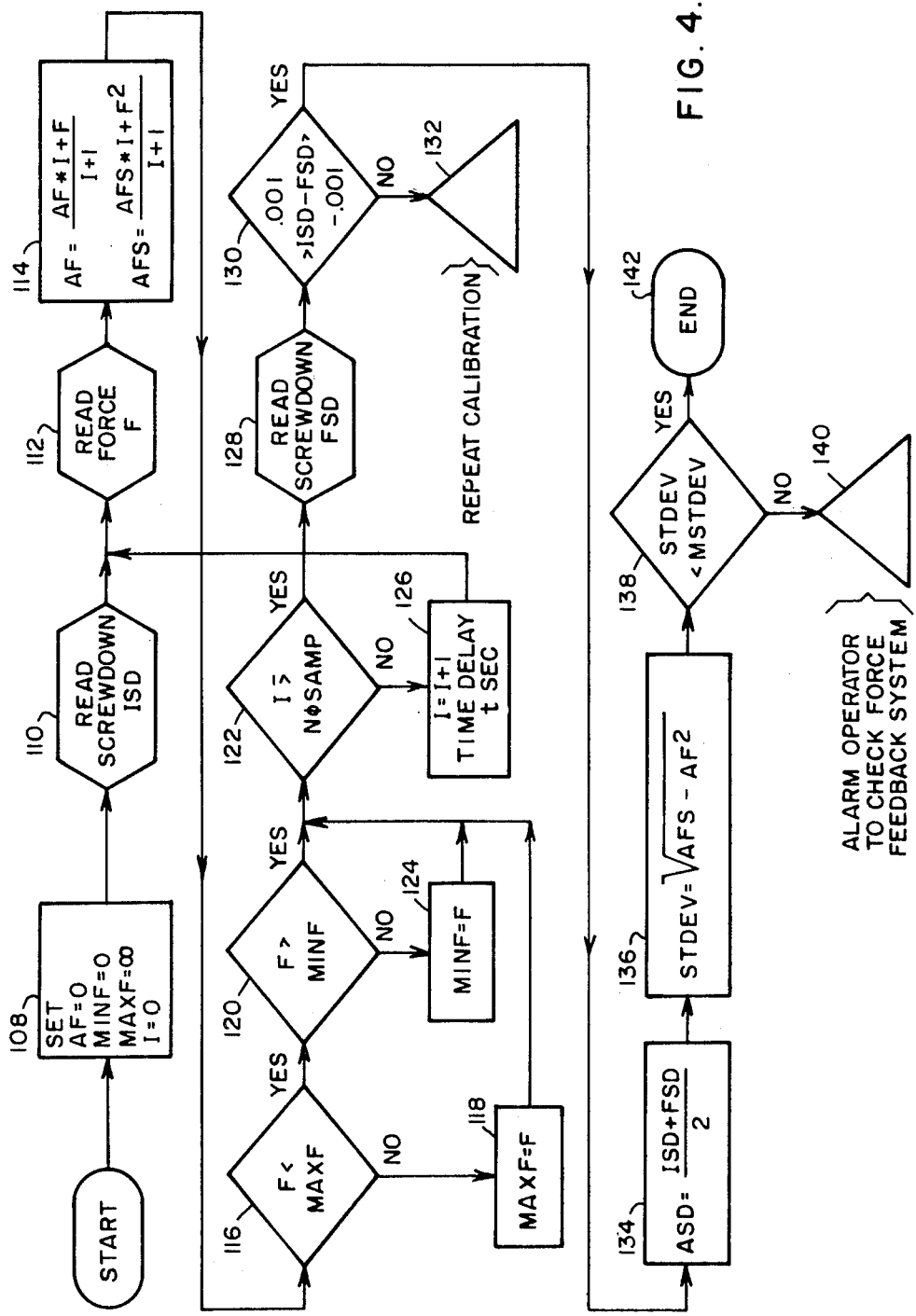
In FIG. 4 there is shown the computer functional control program flow chart for the subroutine included in the FIG. 3 program flow chart.

In FIG. 4 there is shown a control program that is included as a sub-routine within the step 104 shown in FIG. 3, and is initiated when an individual stand roll force load cell 26 indicates that a given stand (N) to be calibrated is at the desired initial calibration force level ICF. In FIG. 4 the step 108 sets the stand average roll force AF equal to zero, the minimum roll force MINF equal to zero, the maximum stand roll force MAXF equal to infinity and the number of readings taken I equal to zero. Step 110 reads an initial screwdown position setting ISD(N) before a first sample reading of the stand roll force is taken. In step 112 the stand roll force F(N) is read. In step 114 an average force AF for stand N is determined as the product of the previous average force AF determined for that stand times the number of readings I taken plus the last sampled stand roll force F(N), divided by the previous number of readings taken plus one. For the first roll force reading taken, the previous average stand roll force AF is zero, so in effect the average stand roll force AF is the first roll force reading divided by one. As successive readings are taken, there occurs an averaging of these readings. The stand average force squared AFS is determined as the product of the previous average force squared for the same stand N times the number of readings I that have been taken plus the now sampled stand roll force reading squared and this sum is divided by the previous number of readings taken I plus one. In step 116 the now sampled stand roll force F is compared with the previous maximum value of the sampled stand roll force MAXF that has been read during this sampling period to see if it is less than this value. If it is larger than the previous maximum stand roll force MAXF for stand N, step 118 sets the stored value for MAXF equal to the now sampled stand roll force F. If the now sampled stand roll force F is less than the previous stored value for MAXF, then the program proceeds to step 120 where a comparison is made to see if it is greater than the previous minimum sample stand roll force MINF, and if it is greater the program proceeds to step 122 which keeps track of the number of samples taken and could typically provide a limit in the order of 10 samples. On the other hand, if the now sampled stand roll force as compared in step 120 is less than the previous minimum stand roll force MINF, step 124 sets the minimum roll force MINF at the same value as the present sample stand roll force F. Step 126 adds one to the number of readings taken I, after a suitable time delay which may be in the order of 1/10 second and causes the sequential operations as determined in steps 112 through 124 to be repeated until the desired number, for example ten, of stand roll force samples have been taken. Then step 128 causes a reading of the final stand screwdown position FSD for the stand N after the 10th reading is taken of the stand roll force F. Step 130 compares the difference between the initial stand screwdown position ISD and the final stand screwdown position FSD, to see if this difference is within a range of ±.001 inch. If this difference is outside this range, step 132 causes the program to repeat the FIG. 4 roll force sensing calibration operation so far described relative to steps 108 through 128. If this difference is within the allowable limits, step 134 determines the average screwdown position ASD(N) for stand N during the period of the reading of the ten stand roll force samples taken, as the sum of the initial stand screwdown position ISD plus the final stand screwdown position FSD divided by two. Step 136 determines the stand N force deviation STDEV as the square root of the difference between the calculated average force squared ASF for stand N minus the square of the calculated average force AF(N). Step 138 compares the stand force deviation STDEV with an allowable or limit maximum stand force deviation MSTDEV and if the former is not less than the latter, step 140 provides an alarm to the opertaor to check the force feedback system in that the force samples taken during the ten sampled readings for stand N include unreasonable deviations. At the end of the FIG. 4 sub-routine as indicated by step 142, the program returns to the program of FIG. 3.

In step 144 shown in FIG. 3, the now determined values as indicated are stored in the computer memory. The initial calibration force ICF is stored as the average force AF taken by the ten sample readings during the initial calibration. The initial maximum force deviation IMAXFD is stored as the maximum force value MAXF that was read minus the average force AF. The initial minimum force deviation IMINFD is stored as the average force AF minus the minimum force value MINF that was read. The initial average screwdown IASD(N) during initial calibration and determined by an average of the two readings from the screwdown position detector made at the beginning and the end of the roll force sampling, is stored as the average screwdown position ASD that was determined during the sampling period. In the step 146 the initial average calibration force ICF during the initial stand calibration operation is compared with the acceptable minimum calibration force MINCF and the acceptable maximum calibration force MAXCF; for example, the initial average calibration force ICF, in the order of four million pounds, is compared with an acceptable minimum calibration force MINCF of 3.6 million pounds and a maximum acceptable calibration force MAXCF of 4.4 million pounds, and if it is either less than the minimum calibration force or greater than the maximum calibration force, the step 148 indicates to the operator that the initial calibration force ICF is out of desirable limits and not suitable. If the comparison test performed in step 146 is satisfied, the program proceeds to step 150 where the screwdown reference position SDREF for the final calibration force of stand N is determined as the initial average screwdown position IASD plus the desired movement MOVE or change in screwdown position, and this final screwdown reference position or final calibration position SDREF is sent to the screwdown positioning control 42, such as shown in FIG. 1, for the particular stand (N) being sampled and calibrated. Step 152 provides a suitable time delay to permit the physical change in stand N screwdown position to be effected.

Step 154 again reverts to the sub-routine program shown in FIG. 4 as previously described. After this sub-routine program operation is completed in the same manner as previously described, only this time the final calibration operation takes place for stand N, the program of FIG. 3 proceeds to step 156.

In step 156, the determined final calibration operation values are entered into storage for the final calibration force FCF equal to the average force AF determined in the final calibration sampling operation. The final maximum force deviation FMAXFD is set equal to the maximum final stand roll force MAXF minus the average roll force AF. The final minimum force deviation FMINFD is set equal to the final average stand roll force AF minus the minimum stand roll force MINF. The final average screwdown position FASD determined during the final sampling is set equal to the average screwdown position ASD during the final calibration sampling operation relative to stand N. In step 158 the difference between screwdown reference position for final calibration SDREF minus the final average screwdown position FASD during the final calibration sampling is compared with the limits of ±.001 inch, to see if this comparison is outside of these desired limits and it is necessary to alarm the operator through step 160 to check the screwdown position detector 24 for the particular stand (N). If this comparison is within the desired limits, the program proceeds to step 162, where the quantity DSDF, which is the apparent mill spring modulus in accordance with the change in screwdown position divided by the change in roll force, is determined in accordance with the difference between the final average screwdown position FASD during the final sampling and the initial average screwdown position IASD during initial sampling, divided by the initial calibration force ICF minus the final average calibration force FCF. The quantity DSDF is generally the same as DSD shown in FIG. 2. In step 164 the apparent mill spring modulus DSDF is divided by the previously determined mill modulus MSK(N) or slope of the linear portion of the mill spring curve for stand N, to determine if this ratio is within the limits greater than .7 and less than 1.3; in other words, has more than a ±30% change in the mill spring curve slope occured relative to a previous determination of same. If this comparison is not satisfied, program step 166 initiates a suitable alarm to the operator to turn off any adaptive gauge control for stand N that may be associated with the computer control system 12 and to turn off any roll force gauge control operation provided by the computer control system 12 relative to stand N. If the comparison test of step 164 is satisfied, the program continues to step 168 where this same ratio is checked to see if it is greater than .9; if it is not, the program step 170 provides a suitable alarm to the operator to indicate the mill spring modulus has changed slope more than 10% and to check the roll force sensing load cell 26 and screwdown position detector 24 for stand N. The step 172 sets the multiplying adjustment factor FADJ(N) to adjust the stand N roll force feedback signal reading for stand N to .9. When the comparison test of program step 168 is satisfied, then program step 174 checks the same ratio to see if it is less than 1.1; if it is not, the program step 176 alarms the operator again to check the roll force sensing load cell and screwdown position detector for stand N since the mill spring curve for stand N has changed in slope more than 10%. The program step 178 sets the multiplying adjustment factor FADJ(N) to be equal to 1.1. On the other hand, if the test of program step 174 is satisfied, then program step 180 provided effectively a deadband operation, and if this ratio is within a ±3% deadband then the quantity FADJ(N) is set equal to 1 in step 182. If the ratio is outside of the desired deadband of step 180, the quantity FADJ(N) is set equal to the actual ratio of $$\frac{DSDF}{MSK}$$

in program step 184. The control program then proceeds to step 186, where the quantity ICF for the initial calibration force is set as the product of the initial calibration force ICF as sensed by stand N load cell times the stand N multiplying factor FADJ(N). The quantity COS(N), which is the stand N calibration offset in relation to the screwdown roll touching position plus the screwdown stretch change caused by the stand being loaded to the calibration roll force of 4 million pounds, is determined as minus the quantity including the initial average screwdown position IASD during initial sampling plus the screwdown change X(N) due to the non-linear portion of the stand mill spring curve plus the calculated slope MSK(N) of the linear portion of the stand N mill spring curve times the measured initial calibration force ICF. The average force deviation band AVDIF for stand N is determined as the initial calibration sampling period maximum force deviation IMAXFD plus the initial sampling period minimum force deviation IMINFD plus the final calibration sampling period maximum force deviation FMAXFD plus the final calibration sampling period minimum force deviation FMINFD, all divided by two. The average force deviation AVDIF, so calculated, is then multiplied by the multiplying factor FADJ(N) to adjust the force feedback readings for stand N.

To further illustrate the purpose of the calibration offset COS(N), with the stand N empty, assume the quantity IASD equal to .350 mil, the quantity X(N) equal to .045 mil, the mill spring modulus MSK(N) equal to .030 inch per million pounds and the quantity ICF(N) equal to 4 million pounds. The calibration offset, to correct for erroneous operation of the screwdown position detector 24 for stand N, would be as follows:

$$COS\ (N) = -\left[.350 + .045 + \left(\frac{.030}{10^6}\right)4(10^6)\right]$$
$$= -.515\ \text{mil}$$

This indicates that with an initial average screwdown reading of .350 mil, the actual screwdown position would be −.165 mil.

The program then proceeds to step 188 where the now determined average roll force deviation band AVDIF is compared to see if it is less than the maximum allowable roll force variation MAXDIF caused by roll eccentricity; if it does not pass this comparison test, program step 190 sets the roll eccentricity band REB(N) in inches for stand N as equal to the maximum allowable roll force variation MAXDIF times the slope MSK(N) of the linear portion of the mill spring curve for stand N. If the comparison test performed by the program step 188 is satisfied, then in program step 192 the roll eccentricity band REB(N) in inches for stand N is determined by taking the average roll force variation AVDIF times the slope MSK(N) of the linear portion of the mill spring curve for stand N. If the comparison test performed by the program step 188 is not satisfied, then in program step 190 the roll eccentricity band REB(N) in inches for stand N is determined by taking the maximum roll force variation MAXDIF times the slope MSK(N) of the linear portion of the mill spring line for stand N. Program step 191 is provided to alarm the operator when the program step 190 is followed. On the other hand, after step 192, the program of FIG. 3 reaches step 193, which is the end of the program.

Figure 5:
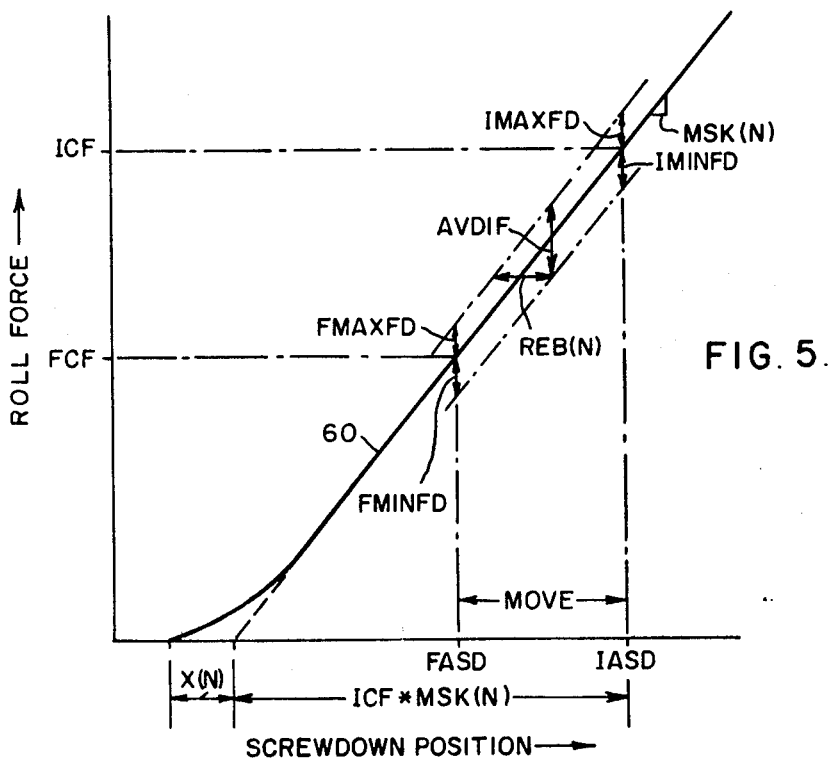
In FIG. 5 there is shown, in relation to a typical stand mill spring curve, the determination of the stand roll force difference values referenced in the flow chart of FIG. 3.

In FIG. 5 there is shown a curve plot of roll force versus screwdown position to accomplish the mill modulus calibration operation in accordance with the teachings of the present invention. The mill spring curve 60 is shown in relation to an initial average stand calibration roll force ICF and a final average stand calibration roll force FCF, the initial maximum force deviation IMAXFD above the initial calibration force ICF and the initial minimum force deviation IMINFD below the initial calibration force ICF. The final maximum force deviation FMAXFD above the final calibration force FCF, and the final minimum force deviation FMINFD for the final calibration step below the final calibration force FCF is shown. The average roll force variation AVDIF is illustrated as is the roll eccentricity band REB(N). The screwdown position movement or change MOVE made between the initial average screwdown position IASD during the initial calibration sampling period and the final average screwdown position FASD during the final calibration sampling period. There is shown in FIG. 5 the screwdown position X(N) attributed to the non-linear portion of the mill spring curve, as well as the screwdown position change due to the stretch of the mill stand as determined by the product of the initial calibration force ICF times the slope MSK(N) of the linear portion of the mill spring curve 60.

Thusly, in general, it will be seen that the sub-routine shown in FIG. 4 determines the average roll separating force AF, the average screwdown setting ASD and the maximum stand roll force MAXF and minimum stand roll force MINF. Step 144 of FIG. 3 saves these initial values, and program step 146 makes sure that the initial calibration force ICF is within allowable limits. A fixed screwdown position movement called MOVE is added to the initial average screwdown IASD in program step 150 to determine a new screwdown reference SDREF(N).

This reference is sent out to the stand N screwdown positioning control shown in FIG. 1 at program step 152, and the control program shown in FIG. 3 is again started at step 154 when a zero error is received from the screwdown positioning control to indicate that the stand screwdown has changed its position and now is in accordance with the new desired reference. The stand roll force and screwdown program sub-routine of FIG. 4 is again used at program step 154 and the here determined final values of this FIG. 4 sub-routine program operation are saved at program step 156 of FIG. 3. A check is made at step 158 to make sure that the screwdown has moved to the proper position; this check should be satisfied unless there is something wrong with the screwdown positioning control and zero error system. The zero error signal is generated by the screwdown positioning system whenever the position feedback and the reference are essentially equal. The time delay at step 152 on FIG. 3 includes a check of the status of the zero error signal. The apparent mill spring constant DSDF is calculated by program step 162 by dividing the screwdown movement by the change in roll separating force to effect this movement, and a check is made at step 164 to make sure that this apparent mill spring constant is within a plus or minus 30% range of the previous stored value for this stand (N). If the error is greater than 30%, program step 166 provides alarm to the operator and all adaptive gauge control relative to stand (N) roll force predictions and updating of those predictions by the computer control systaem 12, and even conventional roll force gauge control is turned off relative to stand (N) because of a probable error in the roll force load cell signal for the particular stand (N) being calibrated. Program steps 168 through 178 check for a 10% error, and if the error is greater or less than 10% the adjusting factor FADJ(N) used to modify the roll force feedback signal as utilized by the computer control system is set equal to the respective limit. If the error is detected at program step 180 to be within a $\pm 3\%$ deadband, the force adjustment is set at a value of one. Values between 3% and 10% of change are used as calculated at program step 184. At program step 186 the initial calibration force ICF is adjusted, and a calibration offset COS(N) for the stand (N) is determined. The average difference in roll separating force AVDIF caused by roll eccentricity is calculated, using the maximum and minimum differences from both the initial and final maximum and minimum readings divided by two to give an average. This average difference is corrected by the force adjustment factor FADJ(N) and limit compared at program step 188. If it is greater than the maximum difference MAXDIF, the program step 190 becomes operative, where the roll eccentricity band REB(N) in inches is calculated using the mill spring constant MSK(N) and the maximum difference, and an alarm is sounded at step 191 to indicate that the roll eccentricity is too great for a good conventional roll force gauge control or adaptive product gauge control operation by the computer control system 12 relative to stand N. If the value is less than the limit comparison, the program step 192 provides the average difference converted to inches by multiplying by the stand mill spring constant. The stand N calibration program is terminated at step 193. It should be understood that the calibration operation here described is followed relative to each stand of the rolling mill in succession one after the other until each stand of the rolling mill has been calibrated as desired.

In FIG. 4 there is shown in greater detail the sub-routine which is used to read the roll separating force and screwdown values. Since it is desirable to sample at a rate and over a period which gives representative maximum, minimum and average roll force readings, it is suggested that the number of samples taken at program step 120 include at least 10 readings and that the time delay provided at program step 126 be set to a value corresponding to approximately $\frac{1}{10}$ of a backup roll revolution. Some fixed representative speed within the operating range of each stand should be chosen and used consistently whenever this calibration is performed. Values are initialized at program step 108. The initial screwdown setting, as measured at step 110, is compared to final screwdown setting, as measured at step 128, to make sure the screwdown positioning system has not moved during the calibration operation. The stand roll force sampled values are measured at program step 112 and a running average is kept at step 114. The maximum and minimum values are chosen at steps 116, 118, 120 and 124. A check is made at step 138 to make sure that the maximum and minimum roll force values are reasonably symmetrical on each side of the average roll force reading.

The useful information gained by the calibration program as shown in FIGS. 3 and 4 for use by other programs operative with the computer control system 12 include the following.

(1) The multiplying factor, FADJ(N) for stand N, is used to adjust the roll force feedback signal from the load cell for stand N. This adjustment for each stand should be used to modify the roll force reading relative to that stand for the engineering data and the adaptive control programs.

(2) The calibration offset COS(N) which is added to the screwdown position to obtain the unloaded roll opening of stand N in accordance with the relationship $h = So + F + MSK(N) + COS(N)$.

(3) Several limit checks and alarm messages are included to indicate to the operator any abnormal conditions which should be called to the attention of the operator relative to a malfunction of the individual stand screwdown position and roll force sensing equipment.

(4) The roll eccentricity deadband REB(N) is used in conjunction with roll force gauge control of stand (N).

It is assumed that any variation in the determined mill stand modulus for a given stand, outside of predetermined permissible limits, is actually an error in the roll force signal from the load cell operative with that mill stand. Within a larger set of limits this error can be automatically corrected by changing the multiplying factor FADJ(N) for that particular stand (N) used when bringing the stand roll force signal into the computer control system and converting it into engineering units as required for the operation of the computer control system. Error signals outside of this larger set of limits should cause the computer control system to initiate an alarm to the operator and indicate a need for maintenance and repair work on the particular stand (N) load cell.

A particularly troublesome disturbance can be caused by eccentric rolls for some stand which cause the roll separation to change each time the roll rotates. This is troublesome where a conventional roll force gauge control is operative with that stand. If the gauge control is tuned to removed skid marks from the strip, this variation in roll separating force for that stand caused by roll eccentricity may cause stand screwdown setting corrections in the wrong direction and result in undesired large work strip gauge variations. As an added feature of the present computer control system instruction program, the variation in stand roll force at the initial calibration point, and the final calibration roll force measured after the move of the screwdown position, can be analyzed to find this variation in roll force at a given screwdown position and in this manner determine the roll eccentricity. This information makes it possible to determine the respective deadband REB(N) which is appropriate at the time for each stand in the mill, so that the deadband can be made no larger than is necessary to prevent the system following these roll eccentricity errors. For a typical stand roll eccentricity condition, the roll force signal from the load cell for that stand follows a sinusoidal waveform and it is required that limits be provided for the variation in this roll force signal. If the roll force signal variation is considered to be caused by roll eccentricity, the computer control system can average this out by reading ten roll force signals per second and then average these readings by dividing by ten to provide a substantially average roll force signal reading, which can be utilized for determining the workpiece strip delivery gauge from the stand as required for the various computer control system programs in accordance with the teachings of the present invention.

It is generally known and understood by persons skilled in the art of applying a computer control system, such as shown in FIG. 1, that a combined hardware and software process control system or an extended control computer machine, which is produced when a general purpose computer is operated under the control of a software instruction program, such as illustrated by the functional program flow charts of FIGS. 3 and 4, can also be built using hardware or wired logic programming in view of the recognized general equivalence of a software programming embodiment and a hardware programming embodiment of substantially the same control system. However, when an involved industrial application such as here described becomes somewhat complex, the economics tend to favor the software approach due to the expense and lack of flexibility when logic circuits, such as the well known NOR logic circuits, are wired together to provide the desired hardware programming circuit arrangement built up of such logic circuits to perform the sequential program steps set forth in the FIGS. 3 and 4 flow charts.

The use of a roll force automatic work strip gauge control system for providing a substantially constant work strip gauge or thickness is well known to persons skilled in this particular art. For example, a published article of interest here to give a background understanding of the involved concept can be found in the 1964 Iron and Steel Engineer Year Book, at pages 753 to 762, by John W. Wallace, and is entitled Fundamentals of Strip Mill Automatic Gage Control Systems.

The use of an on-line digital computer control system requires that a model equation of the controlled process be stored in the memory unit of the computer to enable predictive control of the process and then adaptive control of the process relative to updating information obtained from previous operation of the process. For the example of a rolling mill shown in FIG. 1, to permit a prediction of each stand roll force relative to a given workpiece having a known grade and delivery gauge from the respective stands, a suitable model equation is used to predict the roll force for each stand, and in relation to the reduction to be made in each stand the unloaded roll opening for each stand. This general information is already known by persons skilled in this art and covered by several publications made by the applicant; for example, in the Iron And Steel Engineer Year Book for 1962 at pages 587 to 592 is an article dealing with this subject matter, and two more articles can be found in the Iron and Steel Engineer Year Book for 1965 at pages 461 to 467 and pages 468 to 475. A further publication of interest here, to illustrate the rolling mill computer control environment in which the teachings of the present invention could be utilized, can be found in the Westinghouse Engineer for January 1969, pages 2 through 8, by John W. Wallace and entitled Integrated Process Control Rolls Steel More Efficiently.

The computer control system 12 uses the roll eccentricity band signal REB(N) to determine if the conventional roll force gauge control signal should make a correction in the delivery work strip gauge leaving stand (N). For example, if the actual roll force signal F(N) has a variation which calls for a screwdown movement greater than this deadband REB(N), this permits a new roll force determined delivery gauge H(N) from stand (N), and the computer control system changes the screwdown position reference SDREF(N) sent to the screwdown positioning control 42 as required to bring the actual delivery work strip gauge from stand (N) to the desired delivery gauge.

Although the present invention has been shown in relation to a specific embodiment, it should be readily apparent to those skilled in this art that various changes in form and arrangement of the described apparatus and operations may be made to suit specific application requirements without departing from the spirit and scope of the present invention. For example, it is within these teachings to apply a desired initial calibraton force ICF and then make a predetermned change in the applied stand roll force to FCF, with the resulting screwdown position change being sensed for a determination of the stand mill spring modulus as desired.

I claim:
1. In apparatus for determining an adjustment factor for controlling a rolling mill stand having a pair of work rolls, the combination of
   means for providing two different roll force loading conditions to said work rolls such that there is a difference between said roll force loading conditions to permit a determination of the apparent mill spring modulus for said rolling mill stand,
   means for indicating the respective positions of at least one of said work rolls relative to the other work roll during said roll force loading conditions,
   means for indicating the respective roll forces between said work rolls during said loading conditions,
   means for determining said apparent mill spring modulus in relation to said indicated positions and said indicated roll forces, and
   means for comparing the apparent mill spring modulus of said rolling mill stand with a previously determined mill spring modulus to establish said adjustment factor to control the operation of said rolling mill stand in accordance with said comparison.

2. The apparatus of claim 1, including said means for comparing being operative to determine said adjustment factor in accordance with said apparent mill spring modulus divided by said previous mill spring modulus for controlling the operation of said mill stand.

3. The apparatus of claim 1, with said means for comparing being operative to divide the apparent mill spring modulus by the previously determined mill spring modulus and checking the resulting adjustment factor with at least one predetermined limit to control the operation of said mill stand.

4. The apparatus of claim 3, with said means for comparing providing an alarm indication to the rolling mill operator when said limit check indicates the adjustment factor is greater than said predetermined limit.

5. The apparatus of claim 1, including means operative with said adjustment factor to calibrate the roll force signal provided when a workpiece is transported between said work rolls.

6. In a method of determining an operation adjustment factor for a rolling mill stand having a pair of work rolls, the steps of
   providing a first predetermined roll force load condition to said work rolls,
   adjusting the position of at least one of said work rolls to provide a second roll force load condition to said work rolls,
   establishing the present mill spring characteristic of said rolling mill stand as a predetermined relationship between said first and second roll force load conditions and said position adjustment of said work rolls, and
   comparing said present mill spring characteristic with a previously established mill spring characteristic to determine said adjustment factor to control the operation of said mill stand.

7. The method of claim 6, including the step of providing a roll force indication signal and adjusting said roll force signal in accordance with said adjustment factor for controlling the operation of said mill stand when a workpiece is transported between said work rolls.

8. The method of claim 6, including controlling the positional adjustment of said work rolls relative to the passing of a work strip between said rolls in accordance with said adjustment factor determined as a predetermined ratio of said present mill spring characteristic and said previous mill spring characteristic.

9. In control apparatus operative with at least one stand of a rolling mill to calibrate the operation of said one stand in accordance with the present mill spring characteristic of that stand relative to a previously determined mill spring characteristic of that stand, the combination of first means for providing a first operation of said stand with an initial roll force loading such that the initial roll force is upon the substantially linear portion of the mill spring characteristic curve for that stand and then providing a second operation of said stand with a subsequent roll force loading resulting from a known roll position change effected relative to said first operation, and second means for determining the present mill spring characteristic of said stand as a predetermined relationship between said initial roll force, said subsequent roll force and said known roll position change, with said second means comparing said present mill spring characteristic with said previously determined mill spring characteristic for calibrating the operation of at least said one stand.

10. In apparatus for determining a multiplication factor for controlling the operation of a rolling mill stand having a pair of work rolls and for which a previous mill modulus has been determined, the combination of means for measuring the screwdown position of said stand, means for measuring the roll force of said stand, means for establishing a first screwdown position of the work rolls of said stand in relation to a first roll force and subsequently establishing a second screwdown position of the work rolls of said stand in relation to a second roll force different than said first roll force, means for determining an apparent mill modulus for said stand in accordance with a predetermined relationship between the difference between said first roll force and said second roll force and the difference between said first screwdown position and said second screwdown position, and means for determining said multiplication factor in accordance with a comparison of said previously determined mill modulus with said apparent mill modulus.

11. The apparatus of claim 10, with the first screwdown position IASD being established in relation to a first roll force ICF and with the second screwdown position FASD being established in relation to a second roll force FCF, such that the apparent mill modulus DSDF is determined in accordance with the following relationship $$DSDF = \frac{FASD - IASD}{ICF - FCF}$$

12. The apparatus of claim 1, with the multiplication factor FADJ(N) being determined in accordance with a comparison of the previous mill modulus MSK(N) and the apparent mill modulus DSDF in the following relationship $$FADJ(N) = \frac{DSDF}{MSK(N)}$$

for the rolling mill stand N.

13. A system for controlling the operation of a rolling mill stand having a pair of work rolls and for which a reference mill spring modulus has previously been determined, said system comprising in combination digital computer means operative with said rolling mill stand and programmed to establish a first screwdown position of the work rolls of said stand in relation to a first roll force and subsequently to establish a second screwdown position of the work rolls of said stand in relation to a second roll force, means for indicating said first screwdown position and said second screwdown position, means for indicating said first roll force and said second roll force, with said digital computer means being programmed to establish an apparent mill spring modulus for comparison with said reference mill spring modulus to control the operation of said rolling mill stand, said apparent mill spring modulus being established in accordance with a predetermined relationship of the screwdown position difference between the first screwdown position and the second screwdown position as compared to the roll force difference between the first roll force and the second roll force.

14. The system of claim 13, with said predetermined relationship being $$DSDF = \frac{FASD - IASD}{ICF - FCF}$$

where DSDF is the apparent mill modulus, FASD is the second screwdown position, IASD is the first screwdown position, ICF is the first roll force and FCF is the second roll force.

15. The system of claim 13, with said digital computer means being programmed to compare said apparent mill spring modulus with said reference mill spring modulus in accordance with the relationship $$FADJ(N) = \frac{DSDF}{MSK(N)}$$

where FADJ(N) is the resulting calibration adjustment for controlling the operation of said rolling mill stand N, DSDF is the established apparent mill spring modulus for stand N, and MSK(N) is the previous reference mill spring modulus for stand N.

References Cited
UNITED STATES PATENTS

| | | | |
|---|---|---|---|
| 3,253,438 | 5/1966 | Stringer | 72—12 |
| 3,332,263 | 7/1967 | Beadle et al. | 72—7 |

MILTON C. MEHR, Primary Examiner